(12) United States Patent
Loos (10) Patent No.: US 8,068,640 B2
(45) Date of Patent: Nov. 29, 2011

(54) METHOD FOR DETECTING IMAGE REGIONS THAT ARE CONSPICUOUS IN TERMS OF THE MOVEMENT IN THEM; APPARATUS AND COMPUTER PROGRAM FOR PERFORMING THE METHOD

(75) Inventor: Hartmut Loos, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1057 days.

(21) Appl. No.: 11/837,092

(22) Filed: Aug. 10, 2007

(65) Prior Publication Data

US 2008/0112595 A1    May 15, 2008

(30) Foreign Application Priority Data

Nov. 13, 2006   (DE) .......................... 10 2006 053 286

(51) Int. Cl.
*G06K 9/00* (2006.01)
(52) U.S. Cl. ........................................... 382/103
(58) Field of Classification Search .................. 382/103, 382/104, 107; 348/77, 135, 136, 143, 152, 348/154, 155, 169; 340/541, 565
See application file for complete search history.

(56) References Cited

U.S. PATENT DOCUMENTS

| | | | | |
|---|---|---|---|---|
| 5,973,732 | A * | 10/1999 | Guthrie | 348/169 |
| 2003/0058945 | A1* | 3/2003 | Chiba et al. | 375/240.16 |
| 2003/0152271 | A1* | 8/2003 | Tsujino et al. | 382/190 |
| 2004/0257444 | A1* | 12/2004 | Maruya et al. | 348/169 |
| 2005/0084133 | A1* | 4/2005 | Kawakami et al. | 382/103 |
| 2005/0105765 | A1* | 5/2005 | Han et al. | 382/100 |
| 2006/0045354 | A1* | 3/2006 | Hanna et al. | 382/224 |
| 2010/0254572 | A1* | 10/2010 | Tener et al. | 382/103 |

FOREIGN PATENT DOCUMENTS

| | | |
|---|---|---|
| JP | 2006-99241 | 4/2006 |
| WO | 03/005299 | 1/2003 |

(Continued)

OTHER PUBLICATIONS

Boghossian et al. (Image Processing System for Pedestrian Monitoring using neural classification of normal motion patterns, Special Issue on Intelligent vission systems, Measurment and Control, vol. 32, Issue 9, pp. 261-264, 1999).*

(Continued)

*Primary Examiner* — Jason M Repko
*Assistant Examiner* — Shervin Nakhjavan
(74) *Attorney, Agent, or Firm* — Michael J. Striker (57) ABSTRACT

Video surveillance systems are used for monitoring such areas as streets, railroad stations, industrial plants, buildings, or squares with video cameras, and on the basis of the sequences of images recorded with the video cameras, discovering anomalies in the monitored areas. A method for detecting image regions that are conspicuous in terms of the movement in them in a sequence of images of a scene and a corresponding apparatus and computer program are proposed, in which a current optical flow field in the sequence of images is calculated that includes motion vectors of image regions of the scene; an optical main flow field is determined that includes main flow directions of image regions of the scene; and a counterflow field with motion vectors of image regions that are conspicuous in terms of the movement in them is formed from image regions of the scene whose motion vectors are oriented differently from the main flow directions.

14 Claims, 4 Drawing Sheets

FOREIGN PATENT DOCUMENTS

WO 2005/006762 1/2005

OTHER PUBLICATIONS

Takahiko et al. ("Estimating Human Flow-Speed for Video Surveillance by Probabilistic Stands" IEEE, Conference on sybernetics and intelligent systems, Dec. 2004).*

Carswell et al. ("Automated Recognition of Drunk Driving on Highways from Video Sequences", IEEE, 1994).*

Kentaro Toyama et al: "Wallflower: Principles and Practice of Background Maintenance", IEEE, 1999. Korfu, Greece.

* cited by examiner

METHOD FOR DETECTING IMAGE REGIONS THAT ARE CONSPICUOUS IN TERMS OF THE MOVEMENT IN THEM; APPARATUS AND COMPUTER PROGRAM FOR PERFORMING THE METHOD

CROSS-REFERENCE TO A RELATED APPLICATION

The invention described and claimed hereinbelow is also described in German Patent Application DE 102006053286.4 filed on Nov. 13, 2006. This German Patent Application, whose subject matter is incorporated here by reference, provides the basis for a claim of priority of invention under 35 U.S.C. 119(a)-(d).

BACKGROUND OF THE INVENTION

The invention relates to a method for detecting image regions that are conspicuous in terms of the movement in them in a sequence of images of a scene; an apparatus, in particular for performing this method; and a corresponding computer program.

Video surveillance systems are used for monitoring such areas as streets, railroad stations, industrial plants, buildings, or squares with video cameras, and on the basis of the sequences of images recorded with the video cameras, discovering anomalies in the monitored areas.

While in earlier times the evaluation of the sequences of images was usually done by trained monitoring personnel, this monitoring activity is increasingly being either taken over or at least supported by computers. The computers use image processing algorithms for automatic evaluation of sequences of images. A typical principle for extracting moving objects from a monitored scene is to separate moving objects from the—essentially static—background of the scene, track them over time, and in the event of relevant patterns of motion, trip alarms. For object segmentation, particularly in the context of detecting the object in a sequence of image, the differences in the image between a current camera image and a so-called scene reference image that models the static background of the scene, are typically evaluated. Such image processing algorithms are described for instance in the scientific article by K. Toyama, J. Krumm, B. Brumitt, and B. Meyers: "Wallflower: Principles and Practice of Background Maintenance" in ICCV 1999, Corfu, Greece.

From other fields in image processing, namely video data compression, it is known to use what is known as the optical flow. For example, International Patent Disclosure WO 2005/006762 A2 defines the optical flow as the distribution of motion speeds of brightness patterns in an image, and uses the optical flow to improve the compression in video data streams. However, nothing about object detection or object tracking is found in this reference.

SUMMARY OF THE INVENTION

It is therefore an object of the present invention to provide a method for detecting image regions that are conspicuous in terms of the movement in them as well as an apparatus and a computer program for performing the method, which are further improvements of the existing solutions.

The method of the invention serves to detect image regions that are conspicuous in terms of the movement in them in a sequence of images of a scene. The scene is in particular the area being recorded with a video camera or the like and can be stationary, so that the viewing angle or field of view of the camera is unchanged over time. Alternatively, the scene may also be in motion, for example being recorded by a camera that is pivoted back and forth. A sequence of images is a series of images that have been taken one after the other, and in particular each with the same time interval between them.

Based on the sequence of images of the scene, a current optical flow field is calculated that includes motion vectors of image regions of the scene. The motion vectors, in the simplest case, are embodied as location vectors, which describe the translation of the image regions from one image to the next or to a subsequent image in the scene, and/or as speed vectors, which describe the direction of the motion of the image regions as well as the speed or apparent speed of the image regions from one image to the next or over the course of the sequence of image. The optical flow field is time-dependent and is preferably—particularly in order to suppress interference—chronologically filtered. Preferably, one optical flow field is generated for each new image in the image sequence.

In a further step, which may also be performed before the determination of the current optical flow field, a main flow field is determined that includes main flow directions of image regions of the scene. This main flow field serves as a reference flow field, and for image regions of the scene it indicates main flow directions that correspond to a "normal" motion in the scene. For instance, the main flow direction of an image region of a scene in which a moving escalator is shown, is in the direction of motion of the escalator, since typically both the people and the steps of the escalator are moving in that direction of motion.

According to the invention, from all the image regions of the scene, certain image regions are selected in which the motion vectors are oriented differently from the main flow directions. The selected image regions form image regions that are conspicuous in terms of the movement in them and are used for constructing a counterflow field. The counterflow field thus contains solely motion vectors of image regions that are conspicuous in terms of the movement in them.

The invention is based on the thought that the known methods for detecting relevant motion patterns, which are based on separating the moving objects from the background of the scene, function well, as long as individual objects can be distinguished well enough from one another. However, when the number of objects is becoming higher and higher and these objects are getting closer and closer together, or in other words when the density of objects in the scene is increasing, the individual objects can no longer be distinguished from one another, and segmented regions in the image of various objects fuse into one common object. However, once error-free object segmentation is no longer possible, object tracking cannot be performed successfully any longer, either, and in the known method it finally fails.

According to the invention, object segmentation is first dispensed with, and the sequence of images is examined using the optical flow, so as to attain an analysis of the motion of small regions of the image beyond the sequence of image. In this way, image regions can be detected that for instance flow counter to a main flow direction, and thus objects can be recognized that move counter to the main flow. The proposed invention thus utilizes information that occurs from calculation of the motion of small image regions. For the calculation of these flow fields, it is not necessary to have a reference image of the scene, since only the current camera images are needed.

In a preferred embodiment of the invention, the image regions of the current flow field and/or of the optical main flow field and/or of the counterflow field are embodied as pixels, blocks, or segments. A first option is to process the various fields pixel by pixel, so that for each pixel, a motion vector or a main flow direction is for instance defined. A further option is to define blocks that in particular each have the same size, so that the scene, that is, the flow field, main flow field and/or counterflow field, is regularly subdivided. A further option is subdivision into segments that may be arbitrarily defined. For instance, the aforementioned escalator may form one segment in the counterflow field. In particular, it should be pointed out that the flow field, main flow field and counterflow field need not have the same grouping. For instance, it is within the scope of the invention that the optical flow field is calculated pixel by pixel, while conversely the optical main flow field is grouped into segments.

In one possible alternative embodiment, the main flow field is predetermined either a priori or manually by a user. This alternative embodiment is preferred if, based on the scene being observed, "normal" directions of motion include the user, as in the example of the aforementioned escalator.

Alternatively, the main flow field may also be either generated or updated by the current optical flow field. In the generation of the main flow field, it is provided in particular that the main flow field is formed by means of filtration, and in particular chronological averaging, of successive current optical flow fields. In the case of updating, the main flow field is updated by means of the current flow field, which in particular is filtered, in which already-calculated information is preserved for the most part.

Optionally, an aging algorithm may be used, in which the main flow field is fundamentally generated or updated via chronological averaging, but in addition logical conditions are checked, so that a reversal of the main flow, for instance, can be detected and a change in the main flow field can be initiated.

The counterflow field includes or comprises image regions in which the motion vectors and the main flow directions are each located differently from one another. The degree of deviation is in principle adjustable as a parameter, as a function of the application. In particular in image regions of the counterflow field, the motion vectors and the main flow directions are contrary and/or perpendicular to one another and/or are in an intermediate state between them. In alternative embodiments, it may be provided that even a slight deviation in the orientation, for example over 10°, in particular over 20°, and preferably over 30°, suffices for a corresponding image region to be classified as being conspicuous in terms of motion and to be ascribed to the counterflow field.

In a preferred refinement of the invention, in the counterflow field among the image regions, counterflow regions that are cohesive with the same or similar direction of motion and/or speed are determined. This combination of individual image regions into one counterflow field region corresponds to segmentation in the known image processing methods. However, because the segmentation is performed in the counterflow field and not in the individual images of the sequence of image, the sources of error are minimized. Additional security is attained if it is not merely checked whether the direction of motion matches, or matches sufficiently, but also if the common speed of motion is taken into account. In this way, counterflow field regions that with high certainty cohere can be determined that represent an object, such as a person, even if that object is partially concealed by other objects.

In a refinement of the method, the cohesive counterflow field regions are tracked over time. In particular, for each newly arriving image in the sequence of image, a new current optical flow field is generated, and the cohesive counterflow field regions are detected. In this way, time-dependent trajectories of the cohesive counterflow field regions can be generated, and—as a result—an object detected in this way can be tracked.

In a preferred refinement of the method, upon the occurrence of a cohesive counterflow field region and/or in the event of predefined motion patterns of a cohesive counterflow field region, an alarm is tripped.

The invention furthermore relates to an apparatus for detecting image regions that are conspicuous in terms of the movement in them in a sequence of images of a scene, having the characteristics of claim 8, the apparatus preferably being embodied for performing the method that has just been described.

The apparatus is preferably implemented in the form of a computer or some other programmable device. In particular, the apparatus forms part of a video surveillance system, which besides the apparatus has a plurality of video cameras and/or video monitoring recorders, which are connected to the apparatus by cable or power cord and/or in wireless fashion, for instance via the internet.

The apparatus has a calculation module, which is embodied for calculating a current optical flow field in the scene; the optical flow field includes motion vectors of image regions of the scene. The motion vectors may be embodied as location vectors and/or as speed and/or acceleration vectors.

A determination module is furthermore provided, for determining the optical main flow field; the main flow field describes the main flow directions of image regions of the scene. The determination module may generate or update the optical main flow field on the basis of previous current optical flow fields of the scene; alternatively, the determination module is embodied as an interface or input device, so that a main flow field can be defined by a user.

A generation module is embodied in terms of programming and/or wiring so as to generate a counterflow field, and the counterflow field is formed from motion vectors of image regions that are conspicuous in terms of the movement in them. The motion vectors of the image regions that are conspicuous in terms of the movement in them are oriented differently from the main flow directions of the same image regions.

Optionally, the apparatus includes a segmentation module, which segments image regions having the same or similar motion vectors in the counterflow field to form a cohesive counterflow region.

A likewise optional tracking module is embodied for tracking the detected counterflow region over time, or in other words over further images in the sequence of image, and in particular for generating a trajectory of the counterflow region.

Also optionally, an identification module is provided, which makes it possible to identify the detected or generated counterflow region. In the identification, an association of the counterflow region with an object class is made, for instance persons, car, a suitcase, dog, or the like.

In an advantageous refinement of the apparatus, the apparatus has an alarm module, which is embodied for tripping an alarm upon the detection of a counterflow region and/or if the ascertained trajectory of the counterflow region matches predetermined motion patterns.

A further subject of the invention is a computer program with program code means which is embodied for performing the method on a computer system and/or on an apparatus in accordance with the present invention.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
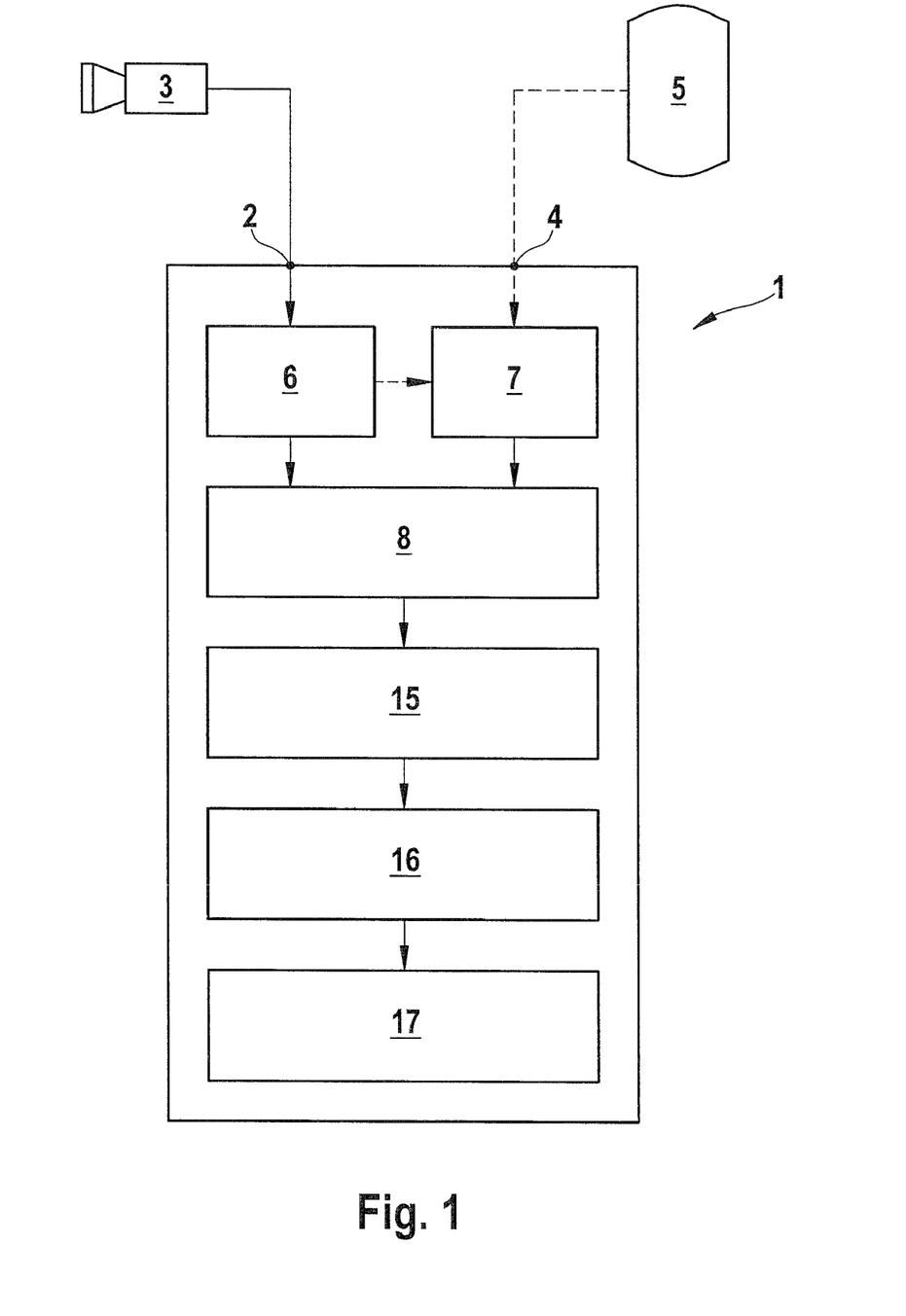
FIG. 1 is a view showing a first exemplary embodiment of an apparatus according to the present invention for performing a method in accordance with the present invention.

FIG. 1 shows a first exemplary embodiment of an apparatus 1 according to the invention, in the form of a computer system, for detecting image regions that are conspicuous in terms of the movement in them in a sequence of images of a scene, in the form of a schematic block diagram. The apparatus 1 includes a first interface 2 for connection to one or more cameras 3 and an optional interface 4 for connection to a database 5, or alternatively to an input device (not shown).

Based on the camera 3, sequences of images are carried via the interface 2 to a calculation module 6, in which, on the basis of the sequences of images, the optical flow of the scene shown in the image regions is calculated. In the calculation of the optical flow, image regions, such as pixels, freely definable segments, or predefined blocks, are tracked from one image to another of the sequence of image. From the results of the calculations, motion vectors are ascertained, which describe the motion of the image regions from image to image, for instance in terms of image coordinates. In a simple embodiment, the motion vectors are defined as translation vectors, that is, location vectors which represent the offset of the applicable image region from one image to another.

In more-complex applications, the motion vectors are formed as speed and/or acceleration vectors. Particularly in the latter case, the optical flow may also be called an estimate of the speed vectors, projected onto the image plane, of visible objects, which are based on brightness patterns in the image. The totality of all the motion vectors of the scene shown in the sequence of images is called the optical flow field and is updated incrementally for newly arriving images in the sequence of image.

A determination module 7 determines an optical main flow field that includes main flow directions of image regions of the scene. The optical main flow field corresponds to a reference field for the ensuing determination of image regions that are conspicuous in terms of the movement in them. The main flow directions correspond to the directions of motion of objects, image regions, etc., which in the course of monitoring are classified as normal.

In a generation module 8, a counterflow field is generated, on the basis of the current optical flow field and of the determined optical main flow field.

Figure 2A:
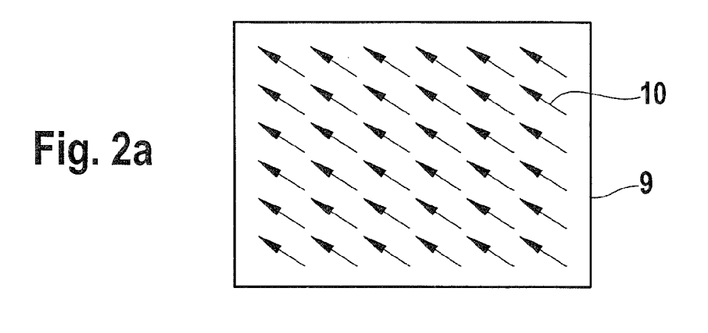
FIGS. 2a, 2b, and 2c are views showing a main flow field, a current flow field and a resultant counterflow field illustrating the method in accordance with the present invention.
Figure 2B:
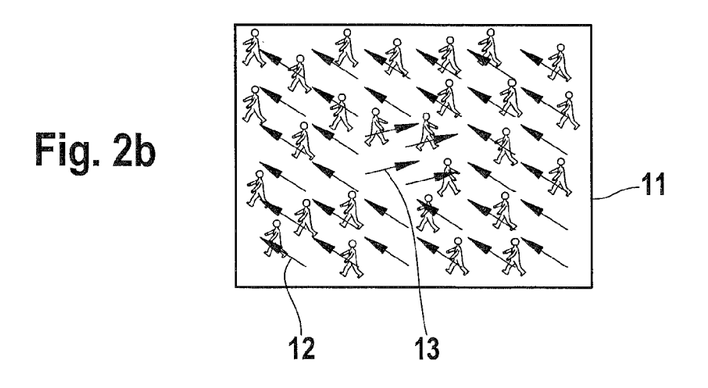
Figure 2C:
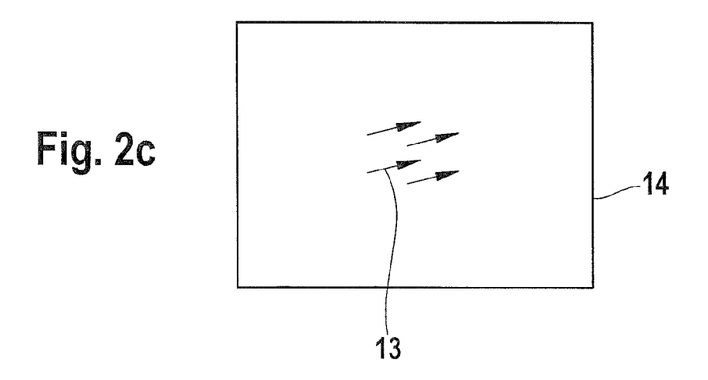

For better comprehension of the generation of the counterflow field, see FIGS. 2a, b and c. FIG. 2a, in a highly schematic view, shows a main flow field 9 that contains only motion vectors 10 that are oriented in a common direction. It should be noted that for the sake of easier comprehension, this main flow field 9 has a simple structure, but in more realistic applications, the main flow field 9 may also include regions of differently oriented motion vectors 10.

FIG. 2b, in a similarly schematic view, shows a current optical flow field 11, as it has been calculated from the sequence of images of a scene. A majority of the motion vectors 12 of the optical flow field are oriented identically and correspond in direction to the motion vectors 10 of the main flow field 9. In the central region, however, a group of motion vectors 13 can be seen that are oriented contrary to the motion vectors 12. These motion vectors 13 represent the motion of objects, such as persons, who are moving counter to the main flow, or in other words against the stream. In the generation module 8 (FIG. 1), the current flow field 11 is filtered with the main flow field 9 so that motion vectors in the main flow direction of the main flow field 9 are suppressed. The resultant counterflow field 14 is shown schematically in FIG. 2c in the same manner as the main flow field 9 and the current flow field 11; it contains only motion vectors 13 that are oriented contrary to the motion vectors 10 of the main flow field 9.

Since the image regions used in the various fields 9, 11 and 14 may be quite small, it is possible in this way for even partly concealed objects that are moving counter to a main flow to be detected. The principle is not to segment the object in the original image in the sequence of images but instead first to extract image regions that have patterns that are conspicuous in terms of motion and to examine or segment the extracted image regions in a further step.

There are various alternatives for determining the main flow field 9. In one, the main flow field may be input manually by a user, for instance into the database 5 (FIG. 1). This procedure is recommended for instance if the observed scene has an unambiguous flow direction of the objects, as in the case of a one-way street, for instance. In addition, the main flow field can be updated by means of the current optical flow field in order to improve the results of the detection. Fully automatic operation, such that the main flow field is generated by current optical flow fields, is an advantageous alternative, if the effort and expense of setting up the apparatus is to be kept low. It may prove advantageous to filter the optical flow chronologically and/or to update the main flow field only with motion vectors 12 that are oriented in the originally specified direction of motion.

As can be seen again most simply from FIG. 1, the counterflow field 14 is transferred to a segmentation module 15, which forms one or more counterflow regions from cohesive or close-together image regions that are conspicuous in terms of the movement in them with the same or similar motion vectors. The formation of the counterflow regions, because of the greatly reduced number of motion vectors in the counterflow field 14 compared to the original current optical flow field 11, is greatly simplified. In particular, in forming the counterflow region the fact is taken into account that the image regions have identically or approximately identically oriented motion vectors, or identically or approximately identically oriented speed vectors.

In a downstream tracking module 16, the counterflow regions formed are tracked over time as tracked objects. To that end, the apparatus 1 is operated sequentially, and for each newly furnished image of a sequence of image, one current optical flow field is generated, and—following the procedure described—a new counterflow region is formed. On the basis of the counterflow regions or tracked objects being tracked, a trajectory of the counterflow regions or tracked objects is formed that is then evaluated in an alarm module 17. The alarm module compares the trajectory or already compares the determined counterflow region with predetermined alarm rules and triggers an alarm signal in accordance with the alarm rules.

Figure 3:
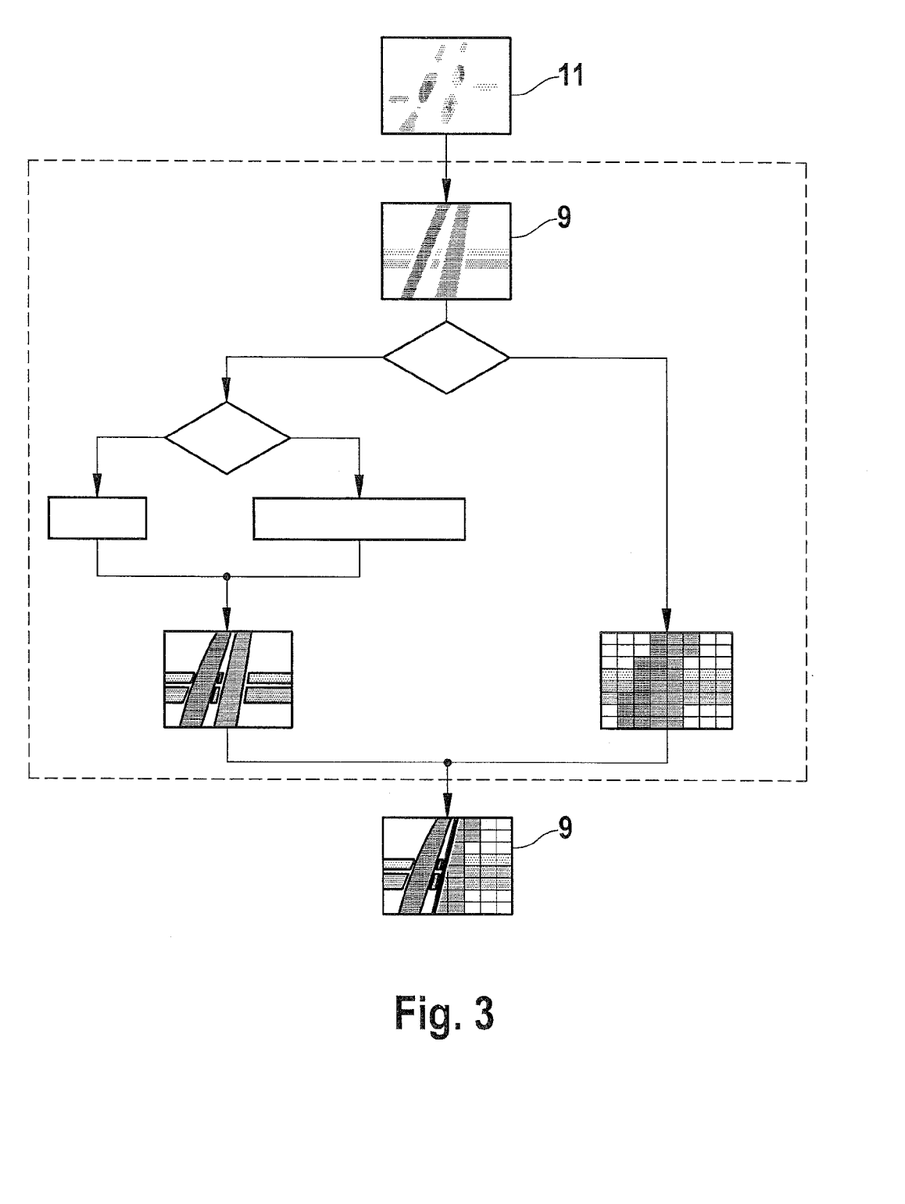
FIG. 3 is a view schematically illustrating a possible alternative method for generating or updating a main flow field.

FIG. 3 schematically illustrates one possible alternative method for generating or updating the main flow field. Here, based on a current optical flow field 11 or a number or series of current optical flow fields, a new main flow field 9 is generated, or an existing main flow field 9 is updated. This procedure can be embodied as a simple averaging over time of the optical flow fields that arrive. Optionally and in addition, the arriving optical flow fields 11 are logically evaluated, so that for instance a distinction can be made between different states of the observed scene (such as a transition from day to night), or that a reversal of direction is detected (such as changing the direction of motion of an escalator), and the main flow field 9 is briefly changed based on the change of state.

The updated main flow field 9 is subdivided—for instance by user input—into blocks or segments, and a mixed grouping in the main flow field 9 is also possible. Particularly upon grouping into segments, these may be predetermined selectively from outside—that is, by a user—or generated by means of segmentation of the main flow field, and image regions with similar main flow directions are combined. As a result, a main flow field 9 divided up into blocks or segments is output and then used for detecting the image regions that are conspicuous in terms of the movement in them.

Figure 4A:
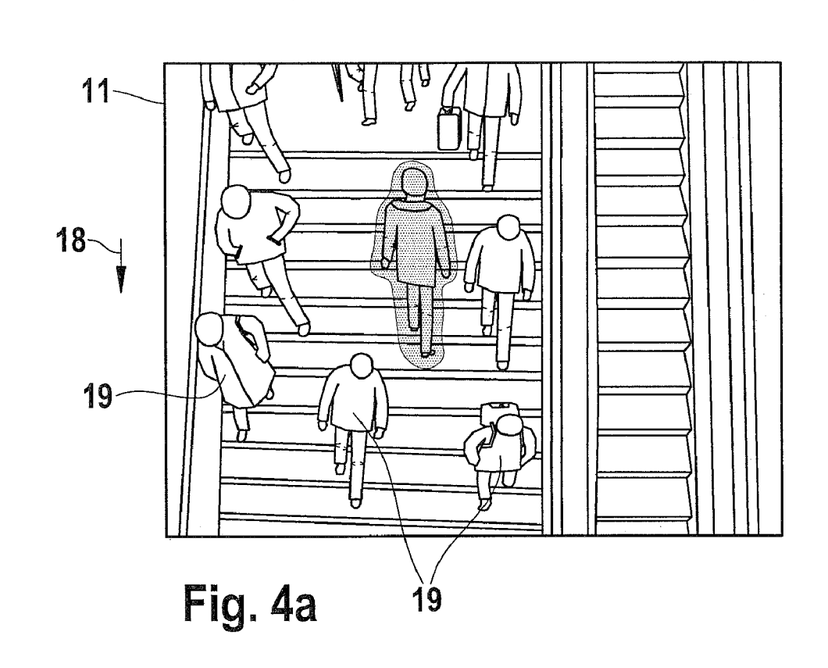
FIGS. 4a and 4b are views showing an application of the apparatus in accordance with the present invention in observing a scene in form of approach to a set of stairs.
Figure 4B:
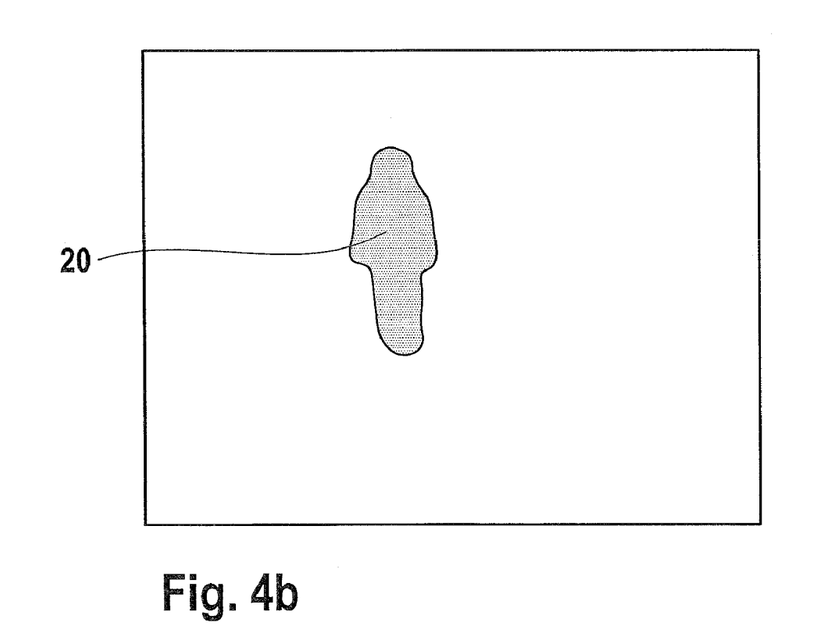

FIGS. 4a and 4b show the application of the apparatus 1 in observing a scene in the form of an approach to a set of stairs. The main flow direction in the scene is oriented from top to bottom in the plane of the drawing as indicated by the arrow 18. In accordance with the main flow direction, nearly all the persons 19 shown are moving in that direction. In a first step, based on a sequence of images of this scene, the optical flow field 11 of the scene is determined and after that filtered with the main flow field, which has only motion vectors or directional vectors in the direction of the arrow 18.

As the outcome of the filtering, an image region 20 is extracted that shows a person who is running up the stairs counter to the main flow direction 18. As can be seen from FIG. 4b, the extracted image regions can now easily be segmented into a tracked object, which in this special case is even classifiable. On the one hand, an alarm can be tripped, since the object moving against the main stream has been classified as a person; on the other, in further tracking of this tracked object, an alarm can be tripped on the basis of the trajectories.

In summary, the analysis of optical flow fields over time is a powerful tool for recognizing an object moving against the main stream. This recognition is possible particularly in scenes that are full of people, but naturally can also be applied in other scenes as well.

It will be understood that each of the elements described above, or two or more together, may also find a useful application in other types of constructions differing from the type described above.

While the invention has been illustrated and described as embodied in a method for detecting image regions that are conspicuous in terms of the movement in them; apparatus and computer program for performing the method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for detecting image regions that are conspicuous in terms of a movement in them in a sequence of images of a scene, comprising the steps of
    calculating a current optical flow field in a sequence of images, that includes motion vectors of image regions of the scene;
    determining an optical main flow field which includes main flow directions of image regions of a scene; and
    forming, on the basis of the current optical flow field and of the determined main optical flow field, from image regions of the scene whose motion vectors are oriented differently from the main flow directions, a counterflow field with motion vectors of image regions that are conspicuous in terms of the movement in them.

2. A method as defined in claim 1, further comprising
    embodying the image regions of a flow field selected from the group consisting of the current optical flow field, the optical main flow field, the counter flow field, and combinations thereof, as elements selected from the group consisting of pixels, blocks and segments.

3. A method as defined in claim 1; and further comprising taking into account the current optical flow field for acting on the optical main flow field in a manner selected from the group consisting of predetermining the optical main flow field, generating the optical main flow field, updating the optical main flow field, and combinations thereof.

4. A method as defined in claim 1, further comprising
    locating the motion vectors in the image regions of the counter flow field in directions selected from the group consisting of contrary to main flow directions, perpendicular to the main flow directions, and both.

5. A method as defined in claim 1, further comprising in the counter flow field, determining cohesive counter flow field regions having a same direction selected from the group consisting of a direction of motion, a direction of speed of motion, and both.

6. A method as defined in claim 5, further comprising tracking the cohesive counter flow field regions over time.

7. A method as defined in claim 5, further comprising tripping an alarm if the cohesive counter flow field regions occur.

8. A non-transitory computer program product having stored thereon a set of computer readable instructions comprising a computer program for performing the steps of the method defined in claim 1, when the computer program is executed on a computer.

9. A method as defined in claim 1, further comprising filtering the current flow field with the main flow field to suppress motion vectors in the main flow direction of the main flow field.

10. An apparatus for detecting image regions that are conspicuous in term of a movement in them in a sequence of images of a scene, comprising
    at least one device comprising:
    a calculation module for calculating a current optical flow field in the scene, which field include motion vectors of image regions of the scene;
    a determination module for determining an optical main flow field including main flow directions of image regions of the scene; and a generation module for generating a counter flow field which is formed of motion vectors of image regions that are conspicuous in terms of the movement in them, on the basis of the current optical flow field and of the determined main optical flow field, wherein the motion vectors of the image regions that are conspicuous in terms of the movement in them are oriented differently from main flow directions of the image regions of the scene.

11. An apparatus as defined in claim 10, further comprising a segmentation module configured for forming a counterflow region from cohesive image regions that are conspicuous in terms of the movement in them having vectors selected from the group consisting of same motion vectors and similar motion vectors.

12. An apparatus as defined in claim 11, further comprising a tracking module configured for tracking the counterflow region over time.

13. An apparatus as defined in claim 11, further comprising an alarm module which is configured for tripping an alarm upon occurrence of the counterflow region.

14. An apparatus as defined in claim 10, wherein the generation module filters the current flow field with the main flow field to suppress motion vectors in the main flow direction of the main flow field.

* * * * *